Patented Dec. 6, 1927.

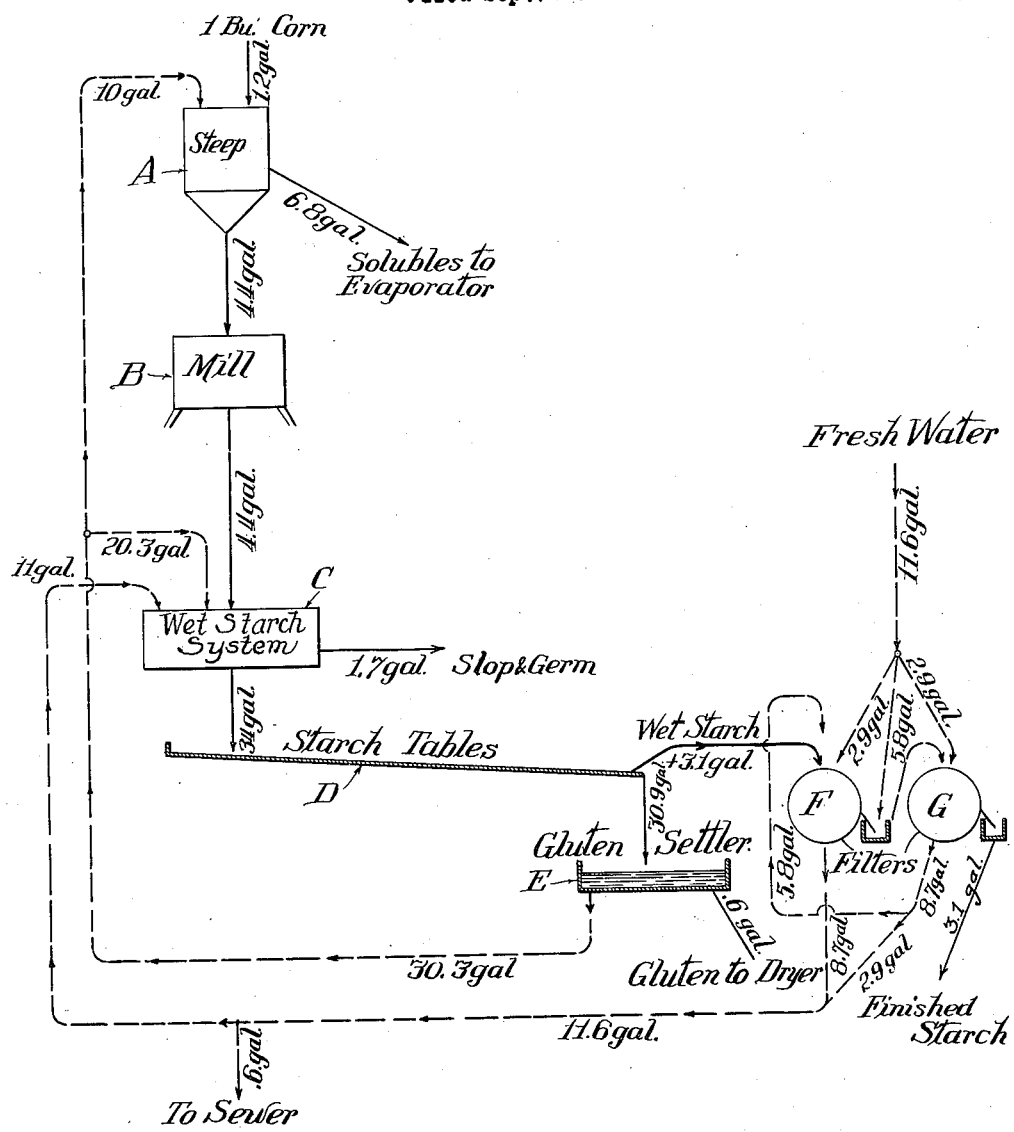

1,651,611

UNITED STATES PATENT OFFICE.

RUSH O. McCOY, OF BERWYN, ILLINOIS, ASSIGNOR TO INTERNATIONAL PATENTS DEVELOPMENT COMPANY, OF WILMINGTON, DELAWARE, A CORPORATION OF DELAWARE.

CLOSED WET-STARCH SYSTEM.

Application filed September 14, 1925. Serial No. 56,299.

This invention relates to the manufacture of starch particularly from corn and its object is to provide certain improvements in the washing or filter-pressing of the starch from the starch tables whereby the solubles may be completely, or substantially completely, removed by the use of such a relatively small amount of fresh water, that it is possible to return to the process not only the liquid from the gluten settlers but also all of the wash water or filtrate from the starch filters, so that the system may be operated as a closed, or a substantially closed, system involving an economy of water, substantially no contamination of streams by sewage outflow and also an increased saving of corn substances soluble and insoluble.

Indian corn is composed of starch, germ, hull, fibre, gluten and certain soluble substances, commonly called corn solubles. According to this usual wet milling process the corn is steeped, which softens the kernel and leaches out some of the solubles, and is then disintegrated and subjected to separating operations with large quantities of water for the purpose of removing the germ, hull and fibre. The mixture of water, starch and gluten is then flowed over starch tables on which the starch settles and from which the gluten and most of the water passes into gluten settlers where a separation is made, between the gluten and water. The starch is either flushed from the starch tables and the starch and water mixture put through a washing filter or the starch is shovelled or stripped from the tables, mixed with water and filtered, the purpose of the filtering or washing being to remove the corn solubles from the starch. The steep water is usually evaporated to recover the solubles leached out by the steeping operation. The waste waters, from the gluten settlers and starch filters have been used back in the process to some extent; but in order to use them completely it has been necessary to provide a method of washing the starch whereby the soluble content of the starch, increased as it is by the use of waste waters back in the process, may be accomplished with such a limited amount of fresh water that all of the filtrate or substantially all, may be returned to the system without producing an impractical dilution of the materials under treatment. The present invention provides such a method.

According to the new process which forms the subject matter of this invention, the starch from the tables is subjected to a double or repeated filterng process, preferably all of the fresh water added to the system being first used in this filtering process. All of the water from the gluten settlers and from the filtering process, is returned to the system and used for steeping and for the separating operations following the milling operation. The use of this water for the separating operations increases the solubles in the tabled starch, but the double filtering process, wherein fresh water is used, extracts these solubles so that the finished starch is as pure as obtained by former processes. Also, since a greater proportion of solubles is contained in the steep water, which is returned to the steeping process, a greater percentage of the solubles may be recovered by the evaporation of the steep water. Practically all of the water taken from the system is that absorbed by the different materials, or that which is evaporated in the process of recovering the solubles.

The objects and advantages of this invention will be more clearly understood from the following detailed description, taken in connection with the accompanying drawing, the latter being a diagram in which the progress of the solid corn products or mixtures of these products with water is indicated in solid lines, and the flow of liquids, that is fresh water, gluten settler water and starch filter filtrate is indicated in broken lines.

The figures and proportions used in this description refer to a single bushel of corn, although obviously a much larger quantity of corn will be carried simultaneously through this process, the quantity of water used being proportionately increased. The quantities of water hereinafter specified are not inflexible, but are merely representative of what has been found satisfactory in practice under usual conditions. Also, although a single unit of each portion of the apparatus is here shown and described, it is to be understood that in most instances a battery or plurality of such units are employed, either simultaneously or in alternation, and that any suitable systems of piping or conveyors are used to carry the products or materials from one piece of apparatus to another, throughout the system.

A bushel of moist corn, when introduced into the steep A will contain about 1.2 gallons of water. With this is added about ten gallons of steep water taken from the gluten settler. The steeping process will remove the greater portion of the solubles from the corn, which proportion of solubles is increased by the amount of solubles carried back from the gluten settler. The wet and softened corn going from the steep to the mill B will carry with it about 4.4 gallons of the water. The remaining 6.8 gallons of steep water go to an evaporator where the solubles are recovered.

In mill B the corn is thoroughly disintegrated, and the resulting material is transported to the separate apparatuses or so-called wet starch system C where 31.3 gallons of water are added. Of this water, eleven gallons come from the final starch filtration processes, and the other 20.3 gallons come from the gluten settler. By the separating operations at C the germ and slop (including the hull and fiber), are removed, and with these wet materials go 1.7 gallons of the water.

The remaining 34 gallons containing the starch, the gluten, and some of the solubles, are allowed to flow over the starch tables D whereon the starch is deposited, retaining in its wet condition 3.1 gallons of water. The remaining 30.9 gallons of water, containing most of the gluten and some solubles, overflows to the gluten settler E where the gluten is deposited. The gluten is removed to a drier and .6 gallons of water are lost in this process. Of the remaining 30.3 gallons of water from the gluten settler, 20.3 gallons go as above described to the wet starch system C, and the other 10 gallons are used for steep water in the steep A.

The tabled starch is then passed successively through a pair of similar starch washing filters F and G, in which the starch is washed with fresh water so as to remove as completely as possible the soluble substances therefrom. The starch from table D is diluted, either in flushing the starch from the tables or, after its removal by other methods, with 5.8 gallons of filtrate from the second filter G and this diluted starch is introduced into the first filter F, and washed with 2.9 gallons of fresh water. The wet starch recovered from filter F, containing as before 3.1 gallons of water is this time diluted with 5.8 gallons of fresh water and introduced into the second filter G and washed with 2.9 gallons of fresh water. The finished wet starch taken from the second filter G carries with it 3.1 gallons of water. The 8.7 gallons of filtrate from the first filter F, and 2.9 gallons of the filtrate from the second filter G (5.8 gallons of this filtrate are returned to the first filter F), are returned to the wet starch system C. There is indicated a possible loss of .6 gallons of water to the sewer, leaving 11 gallons which are returned to the wet starch operations at C along with 20.3 gallons from the gluten settler E so that to all intents and purposes the system is a closed system. In fact it is entirely feasible to eliminate this slight loss by returning all of the filtrate to the system.

It will be noted that all of the fresh water used in this system (11.6 gallons per bushel of corn), is introduced during the starch filtration processes, 2.9 gallons of fresh wash water being introduced into each of the filters F and G, and 5.8 gallons being used to dilute the starch taken from the first filter F before it is introduced into the second filter G. These 11.6 gallons of fresh water added to the filters F and G, together with the 1.2 gallons in the original moist corn make a total of 12.8 gallons of water per bushel of corn used in this system. This water is taken out of the system as follows: 6.8 gallons are evaporated to recover the solubles from the steep A, 1.7 gallons go out with the slop and germ from the wet starch system C, .6 gallons are lost in drying the gluten from settler E, 3.1 gallons are contained in the finished wet starch, and .6 gallons are indicated as lost to the sewer. As stated hereinabove, these figures are merely representative and are subject to considerable variation according to the materials and apparatus used and the conditions of operation, but the essential point to be noted is that the only water added to this closed system is that necessary to replace the water unavoidably lost by absorption in the separated materials or in the evaporation processes. All of this fresh water is first made use of in the double filtration process for purifying the starch, and the filtrates are subsequently retained in the system in such manner that ultimately all of or substantially all of the solubles in the corn are recovered by the evaporation of the steep water with the exception, of course, of the small amount of solubles in the slop and germ which are recovered in that way. A large percentage of the solubles in the starch are washed out by the first filtering operation in filter F. This filtrate goes back to the wet starch system where the solubles are highly diluted. The filtrate from G contains a relatively small amount of solubles so that by using this liquid for diluting the table starch, the amount of fresh water introduced into the system is diminished to the extent of 5.8 gallons per bushel of starch without adding much to the soluble content of the starch. That is the starch is given two washing operations with an intermediate dilution, without increasing the amount of fresh water employed, as would be the case if fresh water were used for both dilutions, and the double washing is so much more effective than a single washing as to much more than compensate for the small quantity of solubles brought into the starch with the filtrate from the second filter. As a result the inflow and outgo of liquids to and from the system may be to all intents and purposes balanced and the system operated as a closed system. It will be recognized that the loss of solubles in any discharge of liquids to the sewer increases disproportionately as the amount of the discharge increases. Therefore, in order that a system of this sort should operate economically a substantial balance should be obtained as between liquids entering the system and those outgoing therefrom through outlets from which recovery of solubles is made. That is it is highly important from an economical point of view that any discharge to the sewer be reduced to the minimum, if possible, to zero.

I claim:

1. A closed system for obtaining starch from corn in which the tabled starch is subjected to a double filtration process, the starch being diluted for and washed during the first filtration with fresh water and the filtrate from the second filtration, the starch filtered by the first filtration being diluted for and washed during the second filtration with fresh water only.

2. A closed system for obtaining starch from corn in which the tabled starch is subjected to a double filtration process, the starch being diluted for and washed during the first filtration with fresh water and the filtrate from the second filtration, the starch filtered by the first filtration being diluted for and washed during the second filtration with fresh water only, and substantially all of the water derived from the starch filtering processes being re-used in the processes preceding the tabling of the starch.

3. That improvement in the process of producing starch by steeping corn, grinding the steeped material, separating starch and gluten from the ground material, tabling the starch and gluten, and draining the liquid from the starch tables to a gluten settler, which consists in returning substantially all of the water from the gluten settler to the steeping and separating processes, subjecting the starch from the tables to a double filtration process in which fresh water is used, and returning substantially all of the filtrate from the filters to said separating process.

4. That improvement in the process of producing starch by steeping corn, grinding the steeped material, separating starch and gluten from the ground material, tabling the starch and gluten, and draining the liquid from the starch tables to a gluten settler, which consists in subjecting the tabled starch to a double filtration process for which fresh water is used, all of the liquid in the steeping and washing operations being obtained from the gluten settler and the starch filtration processes.

5. That improvement in the process of producing starch by steeping corn, grinding the steeped material, separating starch and gluten from the ground material, tabling the starch and gluten, and draining the liquid from the starch tables to a gluten settler, which consists in returning substantially all of the water from the gluten settler to the steeping and washing processes, subjecting the starch from the tables to a double filtration process, the starch treated in the first filter being diluted and washed with fresh water and filtrate from the second filter, and the starch from the first filter being diluted for and washed during the second filtration process with fresh water, the filtrate from the first filter being returned to said separating process.

6. The process of obtaining starch and other materials from corn which consists in steeping the corn with water drawn from the gluten settler, grinding the steeped corn, subjecting the ground corn to a separating operation with water obtained from the gluten settler and from the starch filtration processes, tabling the washed material to separate out the starch, draining the water from the starch tables to a gluten settler, returning the water from the gluten settler to the steeping and washing processes, diluting the starch from the tables with filtrate from a second starch filtration process and delivering this diluted starch to a first starch filtration process in which fresh wash water is used, returning the filtrate from this first filtration process to said separating operation, and diluting the filtered starch with fresh water and washing it with fresh wash water in the second filtration process.

7. In a system for obtaining starch from corn, the step of subjecting the tabled starch to a double filtration process, the filtrates being returned for use in a preceding step of the system.

8. In a system for obtaining starch from corn the process of purifying the tabled starch which consists in first washing the starch and filtering the same, then diluting the starch with fresh water and subjecting it to a second washing and filtering process.

9. In a system for obtaing starch from corn the process of purifying the tabled starch which consists in first washing the starch and filtering the same, then diluting the starch with fresh water and subjecting it to a second washing and filtering process, part of the filtrate from the second washing process being used to dilute the starch for the first washing process.

10. In a system for obtaining starch from corn the process of purifying the tabled starch which consists in first washing the starch and filtering the same, then diluting the starch with fresh water and subjecting it to a second washing and filtering process, part of the filtrate from the second washing process being used to dilute the starch for the first washing process, but fresh water being used for both washing processes.

11. In the manufacture of starch by a process which comprises steeping the starch bearing material, comminuting it, separating the starch and gluten from the germ, bran and fibre, tabling the starch and gluten and removing water from the gluten; the improvement which consists in subjecting the starch successively to two filtering and washing operations, utilizing the filtrate from said second filtering and washing operation for diluting the starch to be treated in the first filtering and washing operation, and re-using in the preceding steps of the process the water removed from the gluten, and the filtrate from said filtering and washing operations.

12. In the manufacture of starch by a process which comprises steeping the starch bearing material, comminuting it, separating the starch and gluten from the germ, bran and fibre, tabling the starch and gluten and removing water from the gluten: the improvement which consists in subjecting the starch successively to two filtering and washing operations utilizing the filtrate from said second filtering and washing operation for diluting the starch to be treated in the first filtering and washing operation, returning the water removed from the gluten, in part to the steeping operation and in part to the separating operations, and returning to the separating operations the filtrate from said filtering and washing operations.

13. In the manufacture of starch by a cyclic process which comprises comminuting the starch bearing material, extracting the starch therefrom by separating operations in water, and returning and reusing in the process the water employed in said separating operations: the improvement which consists in washing the starch in two successive filtering and washing operations, and using in the first filtering and washing operation water from the second filtering and washing operation.

14. In the manufacture of starch by a cyclic process which comprises comminuting the starch bearing material, extracting the starch therefrom by separating operations, in water, and returning and reusing in the process the water employed in said separating operations: the improvement which consists in washing the starch in two successive filtering and washing operations, using in the first filtering and washing operation water from the second filtering and washing operation and returning the water from the first washing operation to said separating operations.

15. In the manufacture of starch the method of washing the starch to remove solubles which consists in diluting the starch, subjecting it to a filtering and a washing operation with fresh water, rediluting it with fresh water, subjecting it to a second filtering and washing operation with fresh water, using the filtrate from the second filtering and washing operation for diluting the starch subjected to the first filtering and washing operation.

RUSH O. McCOY.